Patented June 5, 1923.

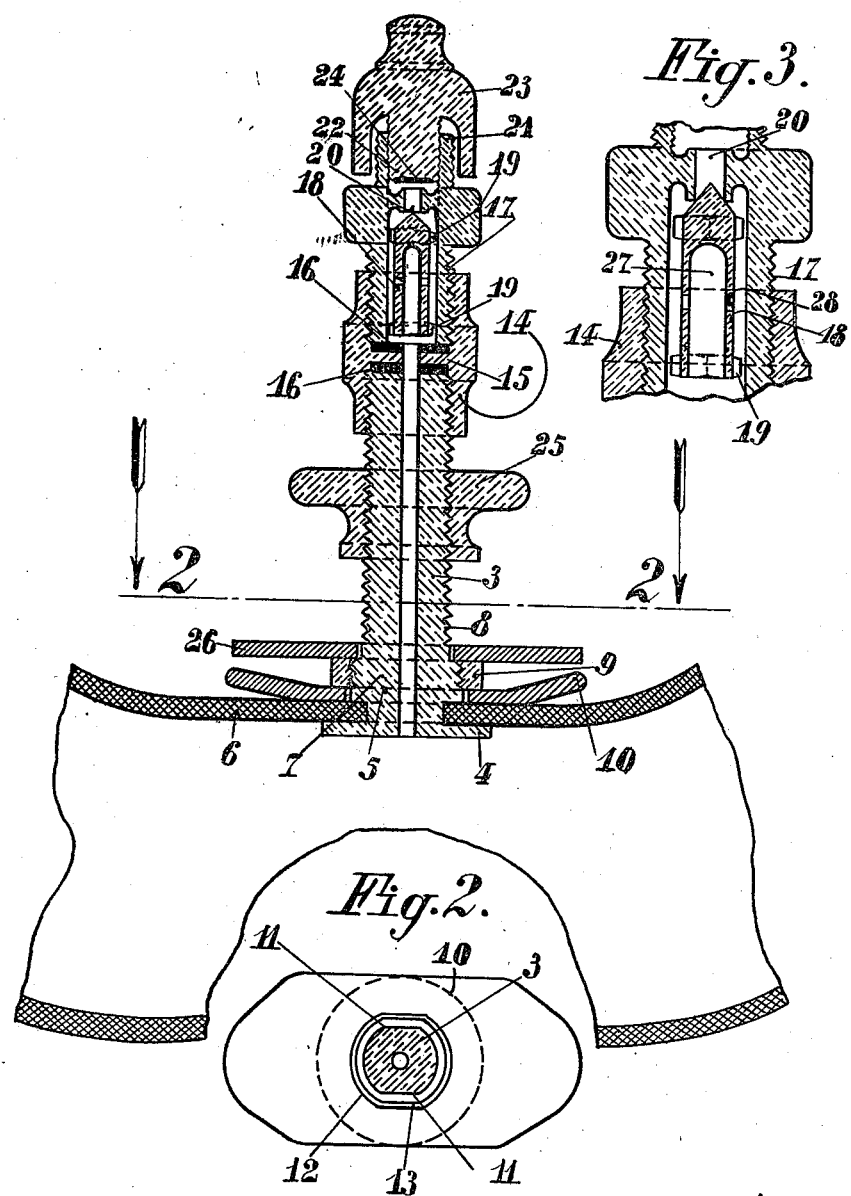

1,457,390

UNITED STATES PATENT OFFICE.

HECTOR PLASSCHAERT, OF WACHTEBEKE-LEZ-GAND, BELGIUM.

VALVE FOR PNEUMATIC TIRES.

Application filed August 18, 1920. Serial No. 404,382.

*To all whom it may concern:*

Be it known that I, HECTOR PLASSCHAERT, manufacturer, of Wachtebeke-lez-Gand, Belgium, have invented new and useful Improved Valves for Pneumatic Tires, of which the following is a specification.

The present invention relates to valves for the inner tubes of pneumatic tires. Its purpose is to create a valve apparatus having the essential parts made in such a way that they are easy to clean and maintain and that they can not be damaged or deteriorated by wear, this apparatus offering, in addition, a certainty of absolute and durable tightness.

Such advantages have not, up to the present time, been obtained with the valves habitually employed, particularly for pneumatic bicycle tires.

In the ordinary valves, which are generally provided with a plunger of rubber or lined with rubber or leather, it is practically impossible to prevent the sticking of this plunger to the seat. Such sticking rapidly causes the rubber or leather to deteriorate and brings about a lack of tightness which necessitates the frequent replacement of the plunger in question and even the entire valve.

With the purpose of obtaining the advantages mentioned above, the improved valve which constitutes the object of the invention does not possess any joint or plunger of rubber, but is provided with fiber joints and an entirely metallic plunger of rugged construction and with dimensions relatively large in relation to the dimensions of the valve body, contrary to that which existed up to the present time.

In addition, the construction is designed in such a way that the edges of the hole cut in the inner tube for the admission of the valve are held tightly between two surfaces with an area large enough, in spite of the small width of the groove in the wheel rim, so that the tightness of the joint between the valve and the inner tube is made more certain.

Moreover, the clamping plate making the joint between the valve and the inner tube air tight is designed so that it can not turn about the valve casing and so that it is locked in the rim groove.

Finally, the tightness of the valve is not made certain only by the plunger but also by the cap which hermetically closes the valve by means of a plug lined on the bottom with a small fiber disc.

As an example only, the accompanying drawing shows a form of construction of a valve designed according to the invention.

Fig. 1 is a vertical cross section taken on the axis of the valve and Fig. 3 is a cross section on an enlarged scale showing the valve plunger in the casing.

Fig. 2 is a horizontal cross section taken on the line 2—2 of Fig. 1, with the nut which locks the clamping plate against the inner tube removed.

In the drawing, 3 indicates the valve tube which ends at the bottom in a flange 4 above which is cut a groove 5 into which enter the edges of the hole in the inner tube 6.

Above this groove, the valve tube has a thread 7 followed by a thread 8 of smaller diameter.

The thread 7 takes the nut 9 clamping the oblong plate 10 in order to make an air tight joint with the inner tube.

The valve tube has along the outside two flat sides 11, while the circular hole 12 cut in the plate 10 so that it can be placed on the tube 3 has two flat sides 13 corresponding to those on the said tube 3.

On the upper end of the tube 3 is screwed a hexagonal coupling sleeve 14 with a central partition 15 provided with two fiber washers 16.

In this sleeve is screwed the valve casing 17 which forms a guide for a special cylindrico-conical plunger 18 with guide vanes 19. This valve casing is provided near the top with a seat 20 for the conical part of the plunger.

Above the valve seat the body of the casing has a tubular projection 21 threaded on the inside to receive the threaded plug on the covering cap 23. This plug is lined on the bottom with a crimped on fiber disc 24 which makes an absolutely tight point when it is screwed tight against the top of the seat 20.

As usual, a milled nut 25 locks the valve tube to the wheel rim 26.

One of the particular features of the valve which is the object of the invention is that the casing 17, forming the guide for the plunger and containing the valve seat, is not placed inside the valve tube but on top of it, and is assembled with the valve tube by means of a coupling sleeve such as 14 with double joint made tight by fiber washers 16—16.

This feature makes possible the rapid dismounting of the valve casing 17 as well as the cleaning and the replacing of the joints 16—16 provided in the sleeve 14 and also the taking out easily of the plunger.

Another result of this feature is that the size of the valve casing is no longer limited, as in the usual arrangement by the diameter of the valve tube 3. The said valve casing being no longer placed inside the tube but joined to the tube by a coupling sleeve, it is possible to make the casing with a diametrical dimension equal or larger than that of the said tube.

On account of this larger size of the said casing 17, it is possible to replace the usual rubber or rubber lined plunger by an entirely metallic plunger such as 18, which never sticks to its seat and may in addition be easily ground so as to maintain the perfect tightness. The perfect and durable tightness of the fiber joints of the coupling 14, which joints can bear on a relatively large surface, can be understood without any other explanation.

Finally, the providing of a supplementary joint 24 between the cap 23 and the valve seat 20 makes possible the certainty of a tightness always hermetic.

The arrangement of the valve casing above the valve tube permits a construction which is rugged and of ample size, causing tighter joints.

The cylindrical part of the body of the plunger 18 is bored axially at 27 almost to the top, so as to leave a thin wall. This wall is pierced laterally by two diametrically opposite holes 28, in order to permit the air discharged by the inflating pump to pass to the inside of the plunger when the latter comes down against the fiber washer 16 under the effect of the discharge from the said pump.

The pressure which exists inside the inflated inner tube acts on the lower surface of the plunger so as to normally press the said plunger against its seat 20.

What I claim is:

1. A valve tube having means to attach the same to a tire, a coupling sleeve screwed to the valve tube, a valve casing screwed to the coupling sleeve, and having a valve seat, a plunger mounted in the valve casing, having guides and also having a pointed end to close against the valve seat, and a cap screwed to the valve casing and arranged to close hermetically against the outer side of the valve seat.

2. A valve tube having means to attach the same to a tire, a coupling sleeve screwed to the valve tube, a valve casing screwed to the coupling sleeve, and having a valve seat, the said coupling sleeve having a partition between the valve tube and the coupling sleeve and also having packing washers therebetween, a plunger mounted in the valve casing, having guides and also having a pointed end to close against the valve seat, and a cap screwed to the valve casing and arranged to close hermetically against the outer side of the valve seat.

3. A valve tube having means to attach the same to a tire, a coupling sleeve screwed to the valve tube, a valve casing screwed to the coupling sleeve, and having a valve seat, a plunger mounted in the valve casing, having guides and also having a pointed end to close against the valve seat, and being further provided with a bore open at the inner end of the plunger, and closed at the outer end thereof and openings leading from said bore to the interior of the valve casing, and a cap screwed to the valve casing and arranged to close hermetically against the outer side of the valve seat.

In witness whereof I affix my signature.

HECTOR PLASSCHAERT.

Witnesses:
F. MIRES,
F. Y. ZALAND.